United States Patent [19]

Cameron

[11] Patent Number: 5,135,611
[45] Date of Patent: Aug. 4, 1992

[54] METHOD AND APPARATUS FOR COMBINED SPRAY DRYING AND GAS CLEANING

[76] Inventor: Gordon M. Cameron, 4 Wellesbourne Crescent, Willowdale, Ontario, Canada, M2H 1Y7

[21] Appl. No.: 528,975

[22] Filed: May 25, 1990

[51] Int. Cl.$^5$ ................................................ B01D 1/8
[52] U.S. Cl. .................. 159/4.01; 23/293 A; 55/259; 55/526; 55/527; 159/16.1; 159/43.1; 159/48.1; 202/197; 202/200; 202/236; 203/40; 203/90
[58] Field of Search ............ 159/43.1, 48.1, 4.01, 159/16.1, DIG. 2; 203/90, 49, 40; 202/236, 197, 200; 134/10; 55/259, 526, 527; 23/293 A

[56] References Cited

U.S. PATENT DOCUMENTS

| | | | |
|---|---|---|---|
| 3,608,567 | 9/1971 | Neill, Jr. ................. | 134/10 |
| 3,620,776 | 11/1971 | Mishkin et al. .......... | 159/48.1 |
| 3,690,044 | 9/1972 | Boresta .................... | 55/259 |
| 4,208,381 | 6/1980 | Isahaya et al. .......... | 423/241 |
| 4,388,283 | 6/1983 | Abrams et al. .......... | 423/242 A |
| 4,472,364 | 9/1984 | Bauerle et al. .......... | 423/242 A |
| 4,519,990 | 5/1985 | Bevilaqua et al. ....... | 423/242 A |
| 4,530,822 | 7/1985 | Ashley et al. ........... | 423/242 A |
| 4,741,803 | 5/1988 | Loeffelmann ............ | 159/4.04 |
| 4,755,366 | 7/1985 | Schwartzbach .......... | 423/240 S |
| 4,789,532 | 12/1988 | Vons et al. .............. | 423/240 S |

FOREIGN PATENT DOCUMENTS

| | | | |
|---|---|---|---|
| 0566612 | 8/1977 | U.S.S.R. .................. | 55/259 |
| 0682131 | 11/1952 | United Kingdom ...... | 55/259 |

*Primary Examiner*—Virginia Manoharan
*Attorney, Agent, or Firm*—Bereskin & Parr

[57] ABSTRACT

A combined spray dryer and gas filter vessel in which a solution containing sulphuric acid and solids, and a hot drying gas, are introduced vertically through the top of the vessel into a spray zone. Solids are removed at a single point at the bottom of the vessel. Filters located above the spray zone clean gas leaving the vessel, and the cleaned gas exits at the top of the vessel. The compact design reduces insulation requirements while avoiding condensation which would create corrosion and yet it provides good separation of solids from gases.

10 Claims, 5 Drawing Sheets

METHOD AND APPARATUS FOR COMBINED SPRAY DRYING AND GAS CLEANING

FIELD OF THE INVENTION

This invention relates to a spray dryer for both recovering suspended or dissolved solids from a liquid by vaporizing the liquid and drying the solids, and separating the solids so produced from the gaseous components.

BACKGROUND OF THE INVENTION

In many cases where dissolved or suspended solids must be separated from a liquid in such a way as to recover a dry solid, a common approach is to use spray drying in which the liquid containing the solids is sprayed into a hot gas. In this process the gas is cooled; the liquids are vaporized, and the solids are dried. This technique has the problem that the solids so produced must be separated from the gaseous components, thereby requiring further processing. In one approach cyclones are used to separate the solids. Other approaches use filter elements such as cloth bags, electrostatic precipitators, and filter elements of sintered metal or ceramic or mineral wool fibers.

The present invention is concerned with the situation where the liquid phase which is evaporated contains a high boiling point corrosive mineral acid such as sulphuric acid and the gases which are produced must be kept at elevated temperatures to avoid condensation and corrosion. For such an application classic filtration materials such as cloth bags cannot be used and gas cleaning must take different approaches. The equipment must also be kept hot as the dewpoints of such gases can be in the range 200° to 300° C.

It will be realised that for spray drying using hot gases, there must be sufficient heat in the gases that all of the liquids can be evaporated and the solids heated all to a temperature above the dewpoint of the mixture. Drying however is not an instantaneous phenomenon and residence times of 20 to 60 seconds in the spray dryer are typical. Because of the relatively long residence time and the large volumes usually involved, spray dryer vessels are typically very large field fabricated units.

If electrostatic precipitators are used for cleaning, gas residence times are typically under 10 seconds which is only a fraction of the time required for drying. If cyclones are used, even less residence time is involved. If cleaning is performed by filtration, the gas will pass through a filter cloth or medium such as sintered metal in a small fraction of a second and the residence time associated with the filtration operation will be essentially the time required to distribute gas to the filter surface and the collection of the gas after filtration. One evaluation concerning the spray drying of a smelter weak acid resulted in a spray dryer vessel with an internal volume of 6,700 cubic feet associated with a sintered metal filter containing 357 filter candles in a vessel with a filter element volume of 186 cubic feet. For this case it was proposed to house the 357 associated candles in a separate vessel 11 feet in diameter by 16 feet high, as compared with the spray dryer vessel which was 20 feet in diameter and 35 feet in overall height. This application was not a large unit and for larger flows, it would be normal practice to use multiple filter vessels with manifolds to distribute to and collect the gases from each filter vessel.

While the above approach is technically feasible, it poses a number of problems for the owner and operator of a plant and better solutions would be desirable. Among the problems with the above approach are the following.

Gases containing sulphuric acid and water in the form of vapor are well known as requiring to be kept hot to avoid corrosion, since most materials are corroded by hot sulphuric acid condensate. Such protection is normally achieved by keeping the gas temperature well above the dewpoint and rigorously insulating the exposed surfaces to prevent heat losses. Such protection also requires that structural steel and all materials which contact the surface be prevented from cooling, and therefore complicates plant and equipment design. The costs and complexities introduced make the simplification of the design a feature of significant value.

A second consideration in keeping a vessel hot is that heat is always being lost and will be lost in proportion to the surface exposed. Any design approach should therefore minimize exposed hot surface.

A further problem is one of scale. The example given above for a spray dryer vessel with sintered metal filter candles represented the largest single filter vessel presently commercially available, and larger flows therefore require multiple units. Multiple units require gas ducting and additional surfaces which require insulation and protection against heat loss. This is costly in terms of capital and operating costs and consumes unnecessary energy.

Classic spray dryer design involves gas and liquids entering in the upper portion of a spray dryer vessel and flowing downward, leaving from the side or bottom. While droplets clearly will fall, taking gas off from a lower portion of the vessel is likely to entrain the solids which one wishes to separate from the gas, and makes the gas cleaning job more difficult. Any approach which takes the gases off from a point where the solids are less likely to be present is therefore likely to be beneficial to the downstream operation.

In addition, many of the solids to be handled in spray drying operations will contain toxic substances or elements such as heavy metals, arsenic, etc and must therefore be closely contained for the safety of plant personnel and the outside environment. Often the spray vessel may be under pressure and leakage around solid takeoffs is difficult to control. Any design approach which generates more than one such takeoff point therefore may create additional hazards for the plant operator and the environment.

Further disadvantages with complex systems include the tendency of solids to settle out in ducts and piping with unknown consequences to the equipment, a lessened ability to ensure economically that all equipment is properly protected against corrosion (e.g. by keeping it above the dewpoint temperature), and the inherent extra expense of maintaining such complex systems.

SUMMARY OF THE INVENTION

It is therefore an object of this invention to provide apparatus in which a spray dryer and cleaning equipment are contained in a single simple vessel which is more easily kept warm and protected against condensation and corrosion. In one of its aspects the present invention provides a single vessel for both spray drying a solution containing sulphuric acid and solids and for filtering resulting gas, said vessel having a sidewall, a top, and a bottom duct means having an outlet portion extending vertically through said top into said vessel and terminating in a gas outlet located in an upper part of said vessel, said gas outlet facing in a downward direction for producing a flow of hot drying gas in a downward direction into said vessel, said outlet portion defining with said sidewall a generally annular space in said upper part of said vessel pipe means for introducing said solution into said vessel, nozzle means associated with said pipe means and being located in said upper part of said vessel and substantially aligned with said gas outlet for spraying said solution in a downward direction, in said flow of hot drying gas, in said vessel spray zone, filter means located in said upper part of said vessel in said annular space for cleaning gas in said vessel, said filter means being located above said gas outlet, said vessel and said filter means together defining a cleaned gas space above said filter means, duct means communicating with said cleaned gas space for removing cleaned gas from said vessel, and solids removal means located in the bottom of said vessel for removing solids from said vessel the use of said single vessel for both spray drying and gas filtering reducing the likelihood of condensation in and consequent corrosion of said vessel.

In a further aspect the invention provides a method of both spray drying a solution containing sulphuric acid and solids and filtering resulting gas in a single vessel having a sidewall, a top, and a bottom, said method comprising spraying said solution downwardly from a spray location in an upper part of said vessel into a space in said vessel, introducing a hot drying gas in a feed duct portion extending downwardly through said top and causing said gas to flow downwardly over said spray location and hence over the sprayed solution to dry the sprayed solution, removing solids from the bottom of said vessel, cleaning gas in said vessel in a filter which is located above said spray location and which filter is located in an annular space between said sidewall and said feed duct portion, and removing cleaned gas from above said filter.

Further objects and advantages of the invention will appear from the following description, taken together with the accompanying drawings.

DETAILED DESCRIPTION OF PREFERRED EMBODIMENTS

Figure 1:
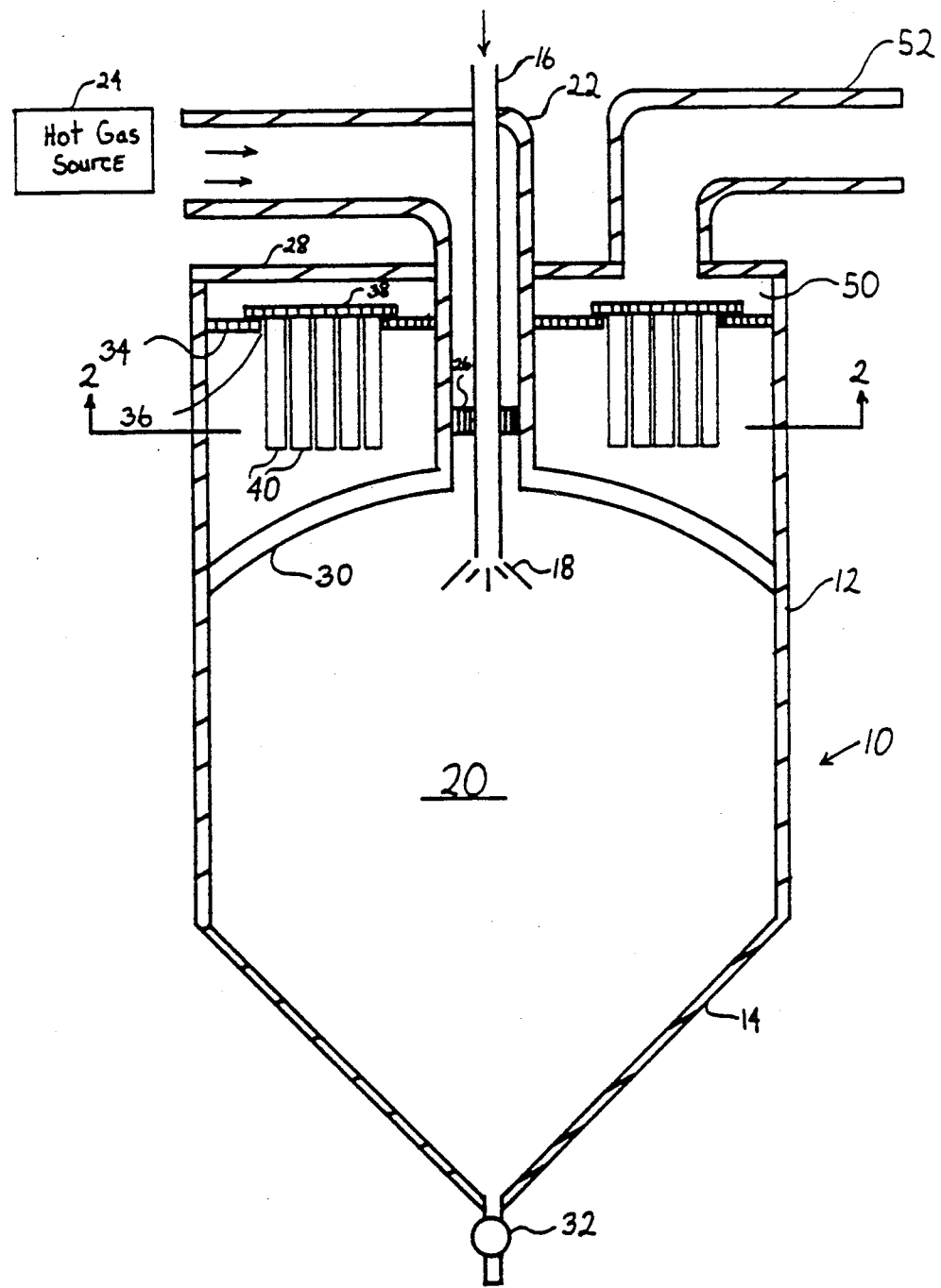
FIG. 1 is a cross sectional view of a combined spray dryer and filter according to the inventions.
Figure 2:
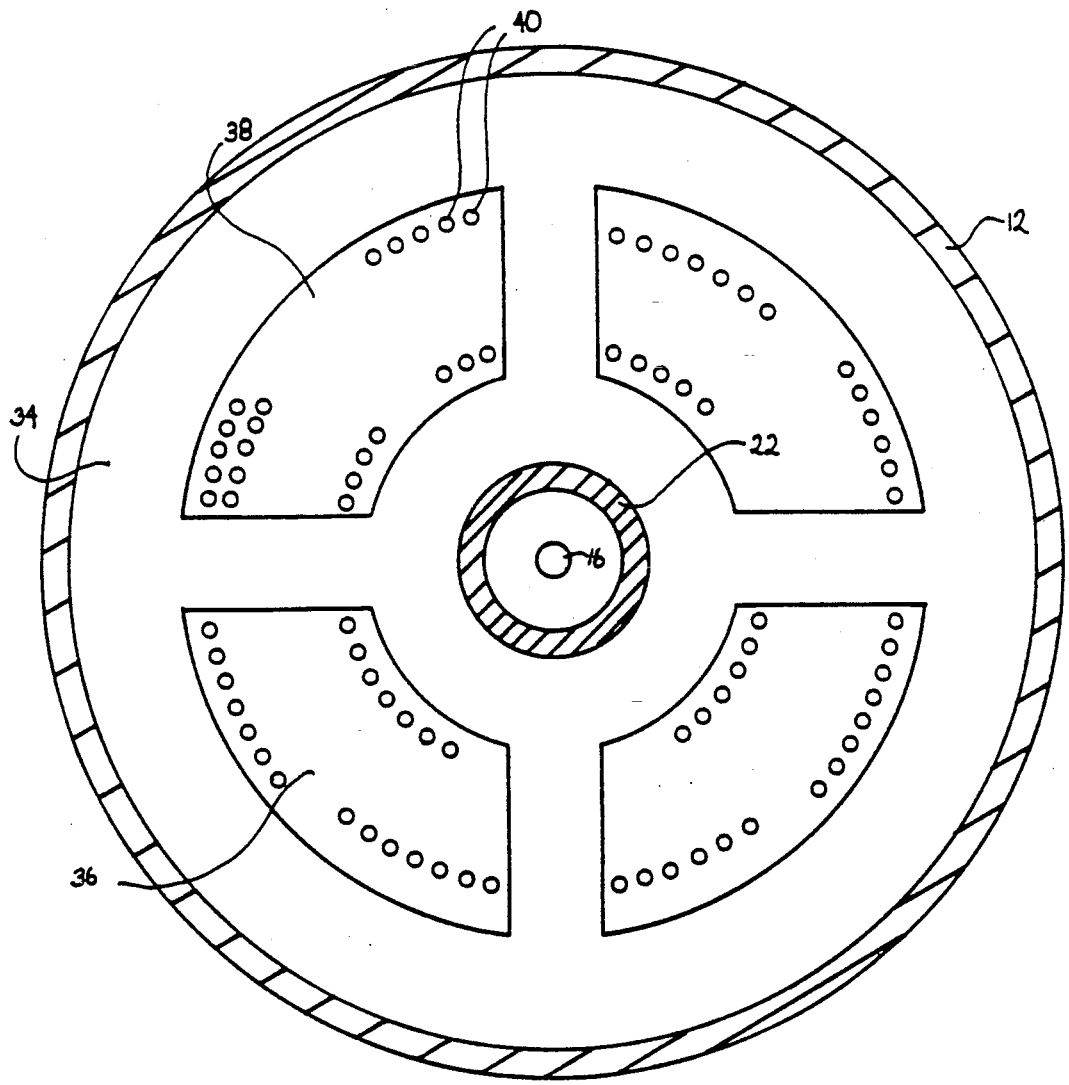
FIG. 2 is a cross sectional view taken along lines 2—2 of FIG. 1.

Reference is first made to FIGS. 1 and 2, which show a combined spray dryer-filter vessel 10 having a cylindrical upper wall 12 and a conical lower wall 14 connected to the upper wall 12. A pipe 16 directed downwardly through the top of the vessel 12 feeds the solution or slurry to be dried to a spray nozzle 18. The nozzle 18 atomizes the solution or slurry in well known manner and distributes it in the chamber 20 formed by the walls 12, 14.

A large duct 22 also enters through the top of the vessel 12 and supplies hot gas to the vessel. The hot gas is supplied from a source 24 which can be a furnace, heat exchanger or other process. The hot gas is directed through a set of vanes 26 to ensure that the gas is evenly distributed. The vanes 26 also act as a support for the feed pipe 16. In known manner, the hot gas vaporizes the sulphuric acid and water in the solution, producing sulphuric acid vapor and water vapor in the vessel 10.

The hot gas inlet pipe 22 can be supported by the top wall 28 of the vessel 10, but in addition and as shown, arches diagrammatically indicated at 30 can be used to provide additional support to the hot gas inlet pipe 22. The number of these arches will depend on the size of the spray dryer but relatively few will be needed.

Solids collected in the spray dryer are removed at the bottom of the hopper formed by wall 14, by a rotary valve 32 which allows solids removal while still sealing the gaseous contents of the vessel from the atmosphere. If the vessel 12 is under internal pressure, valve 32 may be padded with hot pressurized air as is well known.

The annular space defined between the gas inlet pipe 22 and the upper wall 12 contains a generally annular filter support 34. The filter support 34 is a flat plate extending between duct 22 and wall 12 and containing a number of segment-shaped openings 36.

A correspondingly segment-shaped filter plate 38 fits over each opening 36 and extends beyond the margins of the opening 36, thereby resting on support plate 34. Each filter plate 38 includes a number of filter candles 40 which extend downwardly therefrom. The filter candles 40 can be made of sintered metal or porous ceramic and threaded into the filter plate 38 as shown at 42 in FIG. 3, or they can be welded or attached by other appropriate means to the filter plates 38.

The filter plates 38 can simply rest on the plates 34, with appropriate seals if needed, or they can be removably secured by any conventional means such as bolts.

Gases within the vessel 10 (namely the hot drying gas laden with sulphuric acid vapor and water vapor) are cleaned as they pass through the filter candles 40. The clean gases then enter a plenum 50 at the top of the vessel. The plenum 50 is defined by the top wall 28, the upper side wall 12, and the filter support plate 34 as well as the filter plates 38. From plenum 50 the clean gases leave the vessel via duct 52 and may be vented to atmosphere or may undergo further processing.

The vessel 10 may be formed from a carbon steel shell with an internal lining of corrosion resistant acid brick (not shown), and with external insulation (also not shown) to avoid corrosion due to acid condensation. However brick linings will not in all cases be necessary or desirable.

If desired the hot gas may be introduced into the vessel 10 in several streams as opposed to the single stream shown. In addition the liquid feed may be brought in through the side wall 12 to appropriately located spray nozzles.

Cleaning of the filter candles 40 can be accomplished in several ways. The top wall 28 of the vessel 10 can be made removable in sections to allow access to the filter plates 38, so that these plates can be removed with their associated filter elements for cleaning. Alternatively gas can be blown back through the filter candles 40, or the filter candles can be rapped. Individual filter candles 40 can also be cleaned or replaced simply by unscrewing them, if they are threaded into plates 38.

Figure 3:
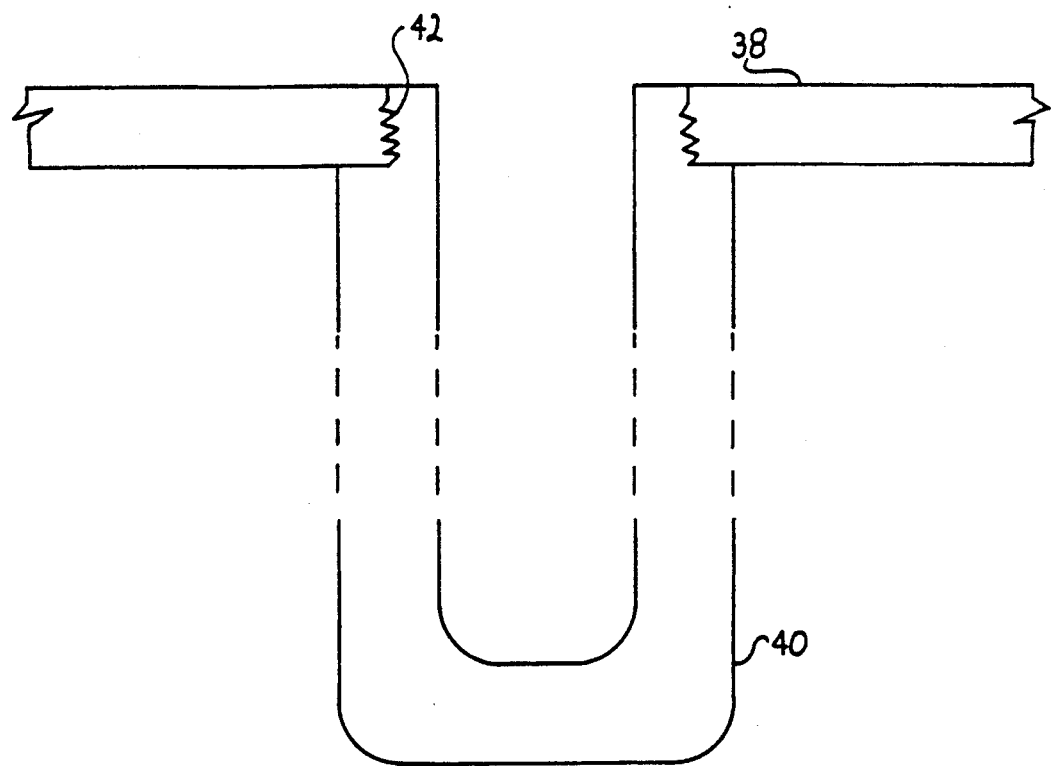
FIG. 3 is a cross sectional view showing a typical filter element for the FIG. 1 apparatus.
Figure 4:
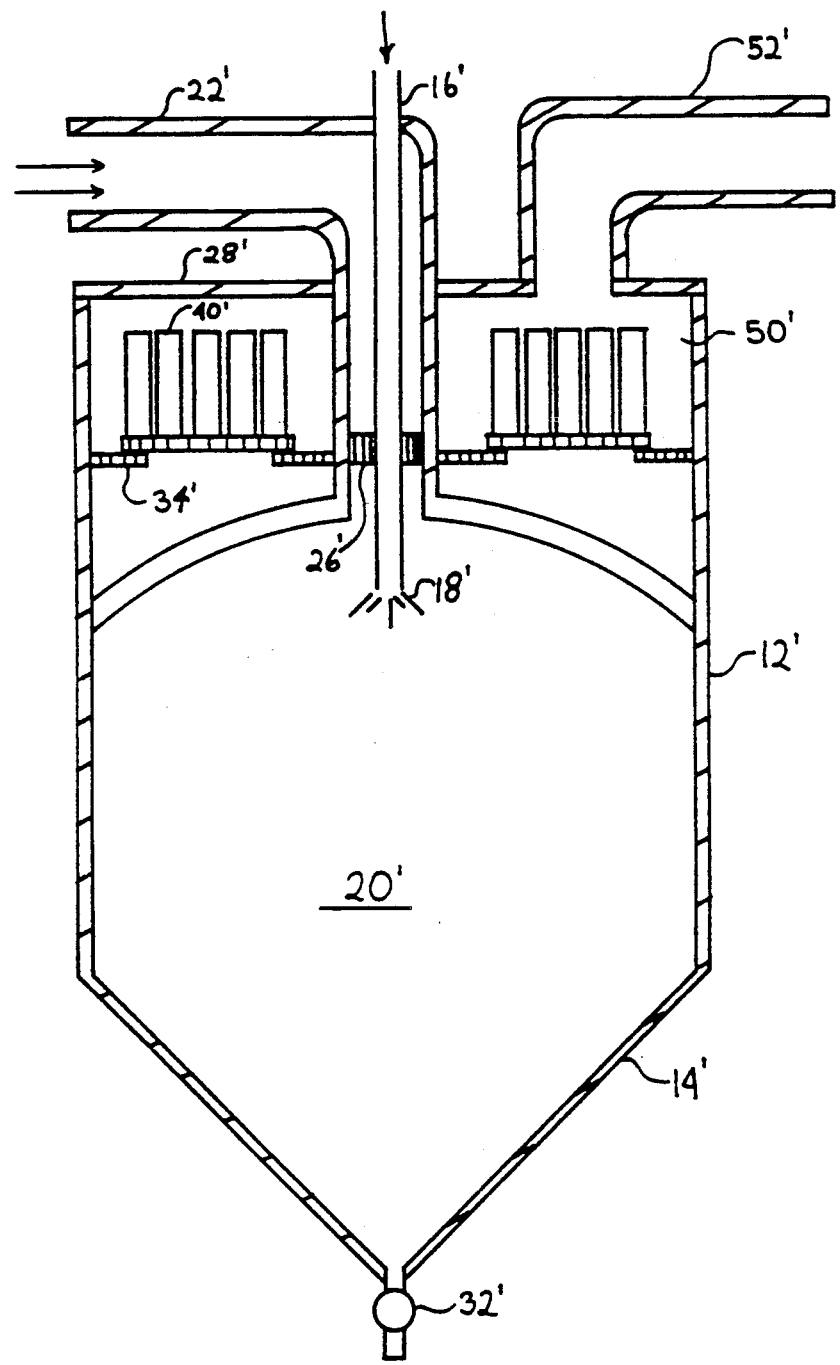
FIG. 4 is a cross sectional view similar to that of FIG. 1 but showing a modification of the FIG. 1 apparatus.

FIG. 4 shows an arrangement similar to that of FIGS. 1 to 3, and corresponding parts are indicated by primed reference numerals. In the FIG. 5 version the filter candles 40' point upwardly into the plenum 50' so that they can be more easily removed individually through access ports (not shown) without removing an entire filter plate 38.

Figure 5:
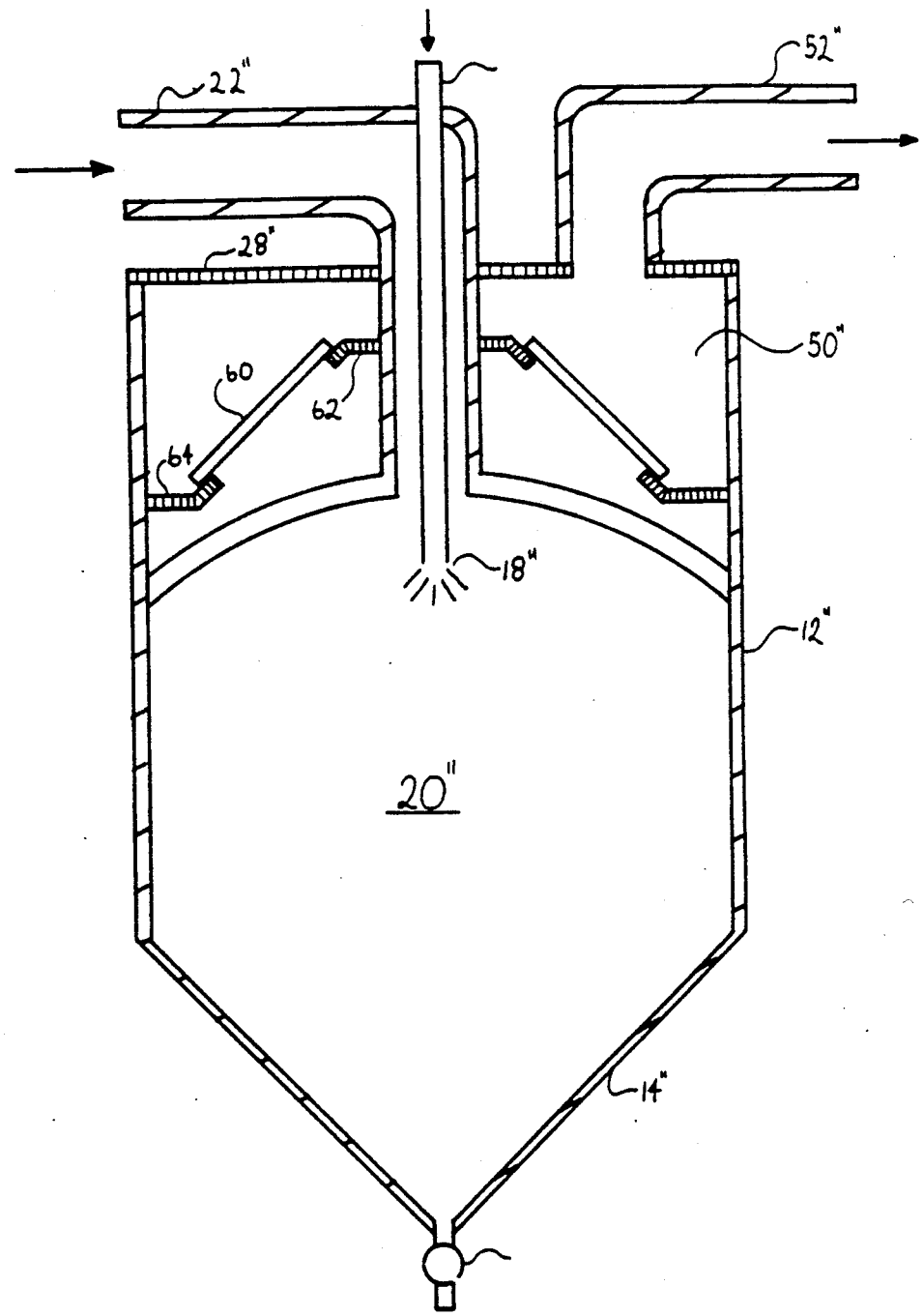
FIG. 5 is a cross sectional view similar to FIG. 1 and showing a further modification of the FIG. 1 apparatus.

FIG. 5 shows another modified version in which double primed reference numerals indicate parts corresponding to those of FIGS. 1 to 3. In the FIG. 5 version the filter plates 38 and their associated candles 40 have been replaced by a conical filter element 60 extending between an upper support 62 and a lower support 64. The filter 60 can be formed in sections and will usually be made of glass or mineral fiber to withstand the heat in the vessel 10. The filter 60 is removable either from the interior 20'' of the vessel or through the upper wall 28'' for cleaning or replacement.

It will be seen that in all cases, the filters are above the spray zone formed by nozzle 18, and the plenum 50 for cleaned gas is above the filters, but both are within the interior 20 of the spray dryer vessel. The solids takeoff 32 is below the spray zone. This allows relatively compact structure, with reduced insulation difficulty, and yet it also allows good separation of the solids from the cleaned gas.

I claim:

1. Apparatus comprising a single vessel for both spray drying a solution containing sulphuric acid and solids and for filtering resultant gas, said vessel having a sidewall, a top, and a bottom; duct means having an outlet portion extending vertically through said top into said vessel and terminating in a gas outlet located in an upper part of said vessel, said gas outlet facing in a downward direction for producing a flow of hot drying gas in a downward direction into said vessel, said outlet portion defining with said sidewall a generally annular space in said upper part of said vessel; pipe means for introducing said solution into said vessel; nozzle means associated with said pipe means and being located in said upper part of said vessel and substantially aligned with said gas outlet for spraying said solution in a downward direction, in said flow of hot drying gas, in said vessel to vaporize sulphuric acid and water from said solution and to dry the solids in said solution; filter means located in said upper part of said vessel in said annular space for cleaning resultant gas comprising the hot drying gas, the sulphuric acid vapor and the water vapor in said vessel, said filter means being located above said gas outlet; said vessel and said filter means together defining a cleaned gas space above said filter means; means for removing cleaned gas from said vessel, said means being connected to said cleaned gas space; and solids removal means located in said vessel bottom for removing solids from said vessel, the use of said single vessel for both spray drying and gas filtering reducing condensation in and consequent corrosion of said vessel.

2. Apparatus according to claim 1 wherein said vessel is substantially circular in cross section, said outlet portion of said duct means extends through the top of said vessel substantially at the center of said vessel, and said filter means surrounds said outlet portion of said duct means.

3. Apparatus according to claim 2 and including filter support means located between said sidewall and said outlet portion of said duct means, said filter means comprising a plurality of filter plates mounted on said filter support means.

4. Apparatus according to claim 3 wherein each filter plate includes a plurality of vertically oriented cylindrical filter elements.

5. Apparatus according to claim 3 wherein said filter plates are removably supported on said filter support means.

6. Apparatus according to claim 3 wherein said filter plates comprise a mineral wool fiber.

7. Apparatus according to claim 1 wherein said filter means includes a plurality of cylindrical filter elements.

8. Apparatus according to claim 1 and including removable access means in one of said top and said sidewall adjacent said top, to facilitate access to and cleaning of said filter means.

9. A method of both spray drying a solution containing sulphuric acid and solids and filtering resulting gas in a single vessel having a sidewall, a top and a bottom, said method comprising spraying said solution downwardly from a spray location in an upper part of said vessel into a space in said vessel, introducing a hot drying gas in a feed cut extending downwardly through said top and causing said gas to flow downwardly over said spray location and hence over the sprayed solution to vaporize the sulphuric acid and water from the solution and to dry the solids in said solution, removing solids from the bottom of said vessel, positioning a filter above the spray location in an annular space between said sidewall and said feed duct, cleaning resulting gas comprising the hot drying gas, the sulphuric acid vapor and the water vapor in said filter and removing cleaned gas from a cleaned gas space defined by the filter and the vessel located above said filter, the use of said single vessel for both spray drying and gas filtering reducing condensation in and consequent corrosion of said vessel.

10. A method according to claim 9 and including the step of introducing said hot gas and said solution coaxially with each other.

* * * * *